US012743572B2

(12) United States Patent
Martinello et al.

(10) Patent No.: US 12,743,572 B2
(45) Date of Patent: Sep. 22, 2026

(54) SYSTEM AND METHOD FOR AUTOMATIC GENERATION OF STANDARD CELLS USING SATISFIABILITY MODULO THEORY SOLVER

(71) Applicant: SILVACO, INC., Santa Clara, CA (US)

(72) Inventors: Osvaldo Martinello, San Jose, CA (US); Guilherme Simoes Schlinker, San Jose, CA (US); Marcos Henrique Backes, Porto Alegre (BR)

(73) Assignee: SILVACO, INC., Santa Clara, CA (US)

( * ) Notice: Subject to any disclaimer, the term of this patent is extended or adjusted under 35 U.S.C. 154(b) by 637 days.

(21) Appl. No.: 18/268,017

(22) PCT Filed: Dec. 15, 2021

(86) PCT No.: PCT/US2021/063568
§ 371 (c)(1),
(2) Date: Jun. 16, 2023

(87) PCT Pub. No.: WO2022/132937
PCT Pub. Date: Jun. 23, 2022

(65) Prior Publication Data

US 2025/0077758 A1 Mar. 6, 2025

Related U.S. Application Data

(60) Provisional application No. 63/126,260, filed on Dec. 16, 2020.

(51) Int. Cl.
*G06F 30/30* (2020.01)
*G06F 30/3323* (2020.01)
(Continued)

(52) U.S. Cl.
CPC ........ *G06F 30/392* (2020.01); *G06F 30/3323* (2020.01); *G06F 30/394* (2020.01);
(Continued)

(58) Field of Classification Search
None
See application file for complete search history.

(56) References Cited

U.S. PATENT DOCUMENTS 8,341,567 B1 12/2012 Tiwary et al.
2015/0135148 A1 5/2015 Tabula

OTHER PUBLICATIONS

N. Bjorner et al., "vZ—an Optimizing SMT Solver," Springer-Verlag Berlin Heidelberg 2015, pp. 194-199. (Year: 2015).*
(Continued)

*Primary Examiner* — Leigh M Garbowski
(74) *Attorney, Agent, or Firm* — William Nuttle

(57) ABSTRACT

An electronic design automation tool and method of operating the same are provided for placement and routing of intra-cell devices in integrated circuits (ICs). Generally the method includes: receiving inputs, creating an instance of a Satisfiability Modulo Theory (SMT) problem for placement and routing by translating the inputs into a set of SMT constraints relating to the placement of intra-cell transistors and routing for interconnects to intra-cell transistors, calling a SMT solver and using the set of SMT constraints generating a solution to the SMT problem, and if the solution satisfies requirements of the inputs and a predetermined area requirement specified by a user, creating and outputting a layout for placement and routing of intra-cell transistors in the IC. The process may be repeated until a predetermined number of ranked solutions or an optimal solution is found. Other embodiments are also disclosed.

17 Claims, 11 Drawing Sheets

(51) Int. Cl.
*G06F 30/392* (2020.01)
*G06F 30/394* (2020.01)
*G06F 30/398* (2020.01)
*G06F 111/10* (2020.01)
*G06F 119/16* (2020.01)

(52) U.S. Cl.
CPC ........ *G06F 30/398* (2020.01); *G06F 2111/10* (2020.01); *G06F 2119/16* (2020.01)

(56) References Cited

OTHER PUBLICATIONS

S. Banerjee et al., "Satisfiability Modulo Theory Based Methodology for Floorplanning in VLSI Circuits," 2016 Sixth International Symposium on Embedded Computing and System Design (ISED), IEEE, pp. 91-95. (Year: 2016).*

D. Park et al., "SP&R: Simultaneous Placement and Routing framework for standard cell synthesis in sub-7nm," 2020 25th Asia and South Pacific Design Automation Conference (ASP-DAC), Jan. 13-16, 2020, pp. 345-350. (Year: 2020).*

F. A. Naguib et al., "Expert Guided Analog Layout Placement and Routing Automation for Deep Nanotechnologies," 37th National Radio Science Conference (NRSC 2020), Sep. 8-10, 2020 IEEE, pp. 240-247. (Year: 2020).*

C.-K. Cheng et al., "A Routability-Driven Complementary-FET (CFET) Standard Cell Synthesis Framework using SMT," 2020 Association for Computing Machinery, 8 pages. (Year: 2020).*

Written Opinion of ISA for International Application PCT/US2021063568, dated Oct. 23, 2024. (Year: 2024).*

European search report Patent Application No. 21907720.3-1218; dated Oct. 23, 2024.

Lee Daeyeal et al: "SP&R: SMT-Based Simultaneous Place-and-Route for Standard Cell Synthesis of Advanced Nodes", IEEE Transactions on Computer-Aided Design of Integrated Circuits and Systems, vol. 40, No. 10, Nov. 16, 2020.

Li Yih-Lang et al.: "MCell: Multi-Row Cell 1-19 Layout Synthesis with Resource Constrained MAX-SAT Based Detailed Routing", Proceedings of the IEEE/ACM International Conference on Computer Aided Design, Nov. 2, 2020 (Nov. 2, 2020).

Tetsuya Iizuka et al: "High speed layout 1-19 synthesis for minimum-width CMOS logic cells via Boolean satisfiability", Proceedings of the Asia and South Pacific Design Automation Conference, Jan. 27, 2004 (Jan. 27, 2004).

International Search Report for International Application PCT/US2021/063568 Mar. 29, 2022.

Written Opinion of ISA for International Application PCT/US2021/063568 Mar. 29, 2022.

* cited by examiner

SYSTEM AND METHOD FOR AUTOMATIC GENERATION OF STANDARD CELLS USING SATISFIABILITY MODULO THEORY SOLVER

CROSS-REFERENCE TO RELATED APPLICATIONS

This International Application claims the benefit of priority to U.S. Provisional Patent Application Ser. No. 63/126,260, filed Dec. 16, 2020, which is incorporated by reference herein in its entirety.

TECHNICAL FIELD

The present disclosure relates generally to integrated circuit design, and more particularly to electronic design automation (EDA) tools for design, layout and routing of elements in complex circuits including multi-layer transistors.

BACKGROUND

The latest generations of integrated circuits (ICs) typically include hundreds of millions or billions of circuit elements or components making electronic design automation (EDA) tools, also referred to as electronic computer-aided design (ECAD), indispensable for their design and verification prior to fabrication. During a standard cell library design process a designer enters into the EDA tool an initial layout scheme or template for one or more cells in the circuit along with a list of components (netlist) and identifies a set of design requirements (technology design rules) for the layout. The EDA tool performs a number of functional tests or simulations, to ensure that the design performs its intended function(s), and generates a number of possible layouts or intra-cell placements for components within sub-circuits or cells of the IC, as well as electrical connections or routing between the components within the cells. The designer may then review a list of possible layouts for intra-cell placement, and intra-cell routing and select the design best satisfying the design criteria.

FIG. 1A is a block diagram illustrating a template 102 for defining a single cell 104 (shown in FIGS. 1A and 1B) to be fabricated or printed on a semiconductor substrate or wafer. Typically, each cell 104 includes one or more electronic, integrated circuit (IC) devices, such as transistors, capacitors or resistors, each formed from a number of different, patterned semiconducting, insulating, and conducting layers. The template defines a few shapes on different layers; most notably power rails to the cell are defined by a top shape which represents VDD 106, or a positive power pin, and a bottom shape which represents VSS 108, GND, or the negative power pin. The rectangle surrounding the cell 104 defines the cell area and has a height 110 and pitch or width 112. Whatever is outside rectangle may be overlapped by neighboring cells. As illustrated in FIGS. 1B and 1C, generally each cell 104 is a single height cell may having the same height as the template shown in FIG. 1A but with a different width 112. The cell 104 shown in FIG. 1B uses 2 pitches, while that shown in FIG. 1C uses 7. Referring to FIG. 1D, the template definition makes it possible for, after synthesis, the cells 104 to be abutted side-by-side in rows 114 and electrically coupled through one or more interconnect layers to compose a design. This design is what is subsequently "printed" on the wafer.

Although existing EDA tools and methods have worked well enough for designing circuits including only single height cells, recent developments in IC design including or requiring the use of multi-height cells, also known as multi-row cells, have proven problematic. FIG. 1E is a block diagram illustrating a one such multi height cell having a total height equal to a whole multiple, larger than one, of the template height of FIG. 1A. Currently, the process for designing cells of an IC including multi-height cells, i.e., a standard-cell library, is still largely done manually with design engineers drawing individual polygons to represent each cell. Since this is a manual endeavor, it is very time consuming and it is prone to human error. Apart from a productivity disadvantage, there is also a diminution in quality and consistency, especially when it comes to designing ICs including multi-height cells.

Thus, there is a need for an EDA tool to design ICs including multi-height cells capable of producing objectively better layouts, with improved metrics, such as reduced area, higher circuit densities or higher metal utilization in routing layers, than possible using existing EDA tools and manual methods. It is further desirable that the EDA tool and method of operating the same provide greater productivity through reduction in design time and improved consistency as compared to prior manual methods.

SUMMARY

The objective of the invention is to provide an electronic design automation tool and method of operating the same are provided for placement and routing of intra-cell devices or transistors in integrated circuits (ICs) including multi-height cells to increase productivity and improve consistency in the delivered results.

In one embodiment, the method includes: receiving input including a netlist, template definition and technology design rules; determining a placement solution based on the received input by translating placement of intra-cell transistors into an Satisfiability Modulo Theory (SMT) placement problem for an area minimal solution, calling a SMT solver and generating a layout for placement of the transistors; and determining a routing solution for the intra-cell transistors based on the received input and the layout by translating intra-cell routing of electrical connections between intra-cell transistors into an SMT routing problem for the technology design rules, calling the SMT solver and generating a layout for placement and routing of the intra-cell transistors. The method can further include repeating the determining of the placement and routing solution for a predetermined number of times or until a placement and routing solution satisfying a predefined metric is met, and automatically ranking the generated placement and routing solutions based on the predefined metric and outputting a list of ranked solutions.

In another embodiment, the method may be split into two separate SMT problems and solutions, including an optional first SMT placement problem and solver purely for the placement of a number of transistors, followed by a second SMT placement and routing problem which may use the solution to the first SMT placement problem to limit the possible positions for transistors. It will be understood that by performing the SMT placement and routing problem limiting the possible transistor positions to be around the SMT placement provided by the first SMT instance, the overall solution time can be reduced.

Briefly, this method can include: (i) receiving inputs; (ii) creating a first instance of a SMT placement problem by translating the inputs into a first set of SMT constraints relating to the placement of a number of intra-cell transistors in the IC; (iii) calling a first SMT solver and generating a first solution to the SMT placement problem; and (iv) if the first solution to the SMT placement problem satisfies requirements of the inputs, creating a first instance of a SMT placement and routing problem using the first solution to the SMT placement problem; and (v) calling a second SMT solver and generating a first solution to the SMT routing problem. If the first solution to the SMT routing and problem satisfies requirements of the inputs and an area requirement specified by a user, a first layout for placement and routing of intra-cell transistors in the IC is created and output to the user. If the first solution to the SMT placement and routing problem does not satisfy requirements of the inputs, the last or latest solution is invalidated and another instance of the SMT placement problem created using the requirement of the inputs, the first SMT solver called and a second solution to the SMT placement problem different from all solutions previously found is generated. This second solution is then used to create a second instance of the SMT placement and routing problem, the second SMT solver called and a second solution to the SMT placement and routing problem generated.

As with the method described above, the method using placement and routing on the same SMT instance, optionally having limited transistor positioning, can further include repeating the determining of the placement and routing solution for a predetermined number of times or until a placement and routing solution satisfying a predefined metric is met, and automatically ranking the generated placement and routing solutions based on the predefined metric and outputting a list of ranked solutions.

In another aspect the invention of the present disclosure is further directed to a non-transitory computer-readable media having program instructions for placement and routing of intra-cell transistors in an IC. Preferably the computer-readable media is stored in or part of an electronic design automation (EDA) tool including at least one processor for execution of the program instructions. Briefly, the computer readable media includes: program instructions for receiving inputs including a netlist, template definitions and technology design rules; program instructions for creating a first instance of a SMT problem for placement and routing by translating the inputs into a set of SMT constraints relating to the placement of a number of intra-cell transistors and routing for interconnects to the number of intra-cell transistors; program instructions for calling a SMT solver and using the set of SMT constraints generating a first solution to the SMT problem; and, if the first solution satisfies requirements of the inputs and a predetermined area requirement specified by a user, program instructions for creating and outputting a first layout for placement and routing of intra-cell transistors in the IC.

BRIEF DESCRIPTION OF THE DRAWINGS

Embodiments of the present invention will be understood more fully from the detailed description that follows and from the accompanying drawings and the appended claims provided below, where:

DETAILED DESCRIPTION

An electronic design automation tool and method of operating the same are provided for placement and routing of intra-cell devices in integrated circuits (ICs).

In the following description, for purposes of explanation, numerous specific details are set forth in order to provide a thorough understanding of the present invention. It will be evident, however, to one skilled in the art that the present invention may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term to couple as used herein may include both to directly electrically connect two or more components or elements and to indirectly connect through one or more intervening components.

At a high level, the process of manufacturing an integrated circuit (IC) starts with a product idea, which is then realized in an iterative, and generally labor intensive design process using Electronic Design Automation (EDA) software. When the design is finalized, a fabrication process and packaging and assembly processes are performed, ultimately resulting in a finished IC chip.

Briefly, in the design process designers describe the functionality to be implemented, write modules for Logic in the system design using a high level description language (HDL) code, such as the VHDL or Verilog code, and check the design to ensure that it produces the correct outputs in response to particular input stimuli. Next, the VHDL/Verilog code is translated to a netlist by a process called technology mapping, which takes a standard cell library as input, and overall floor plan or layout for the chip is constructed and placement or positioning of circuit elements.

During the development of a standard cell library, positioning or placing devices (intra-cell placement) or within cells in an IC, and routing of connections between devices (intra-cell routing), can be particularly problematic and time consuming when the library includes multi-height cells, meaning cells with a total height equal to a whole multiple, larger than one, of the template height.

Figures 1A, 1B, 1C:
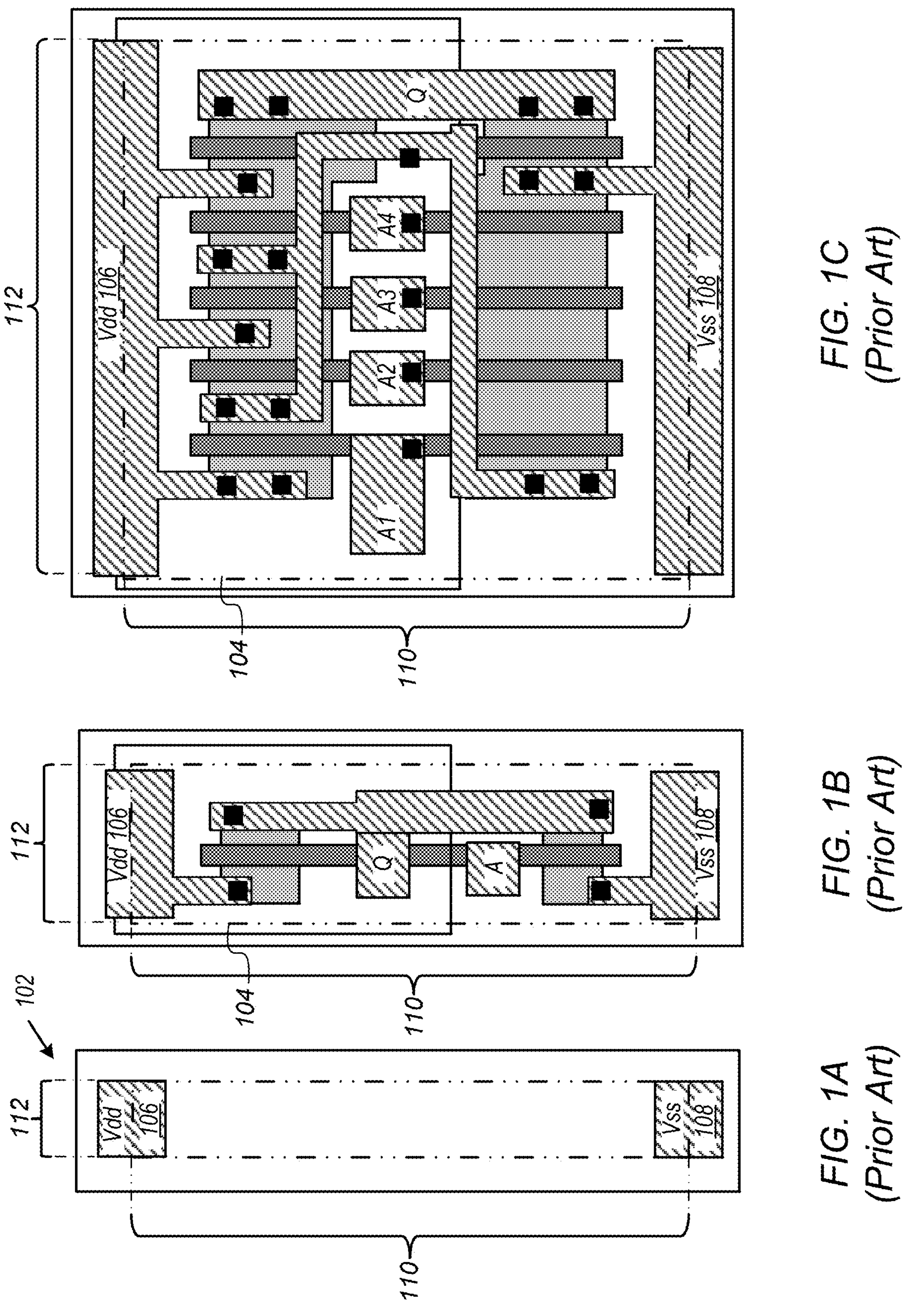
FIG. 1A is a block diagram illustrating a template defining a single cell on a substrate.
FIGS. 1B and 1C are block diagrams, each illustrating a single height cell having the same height as the template definition of FIG. 1A, but having different widths.
Figures 1D, 1E:
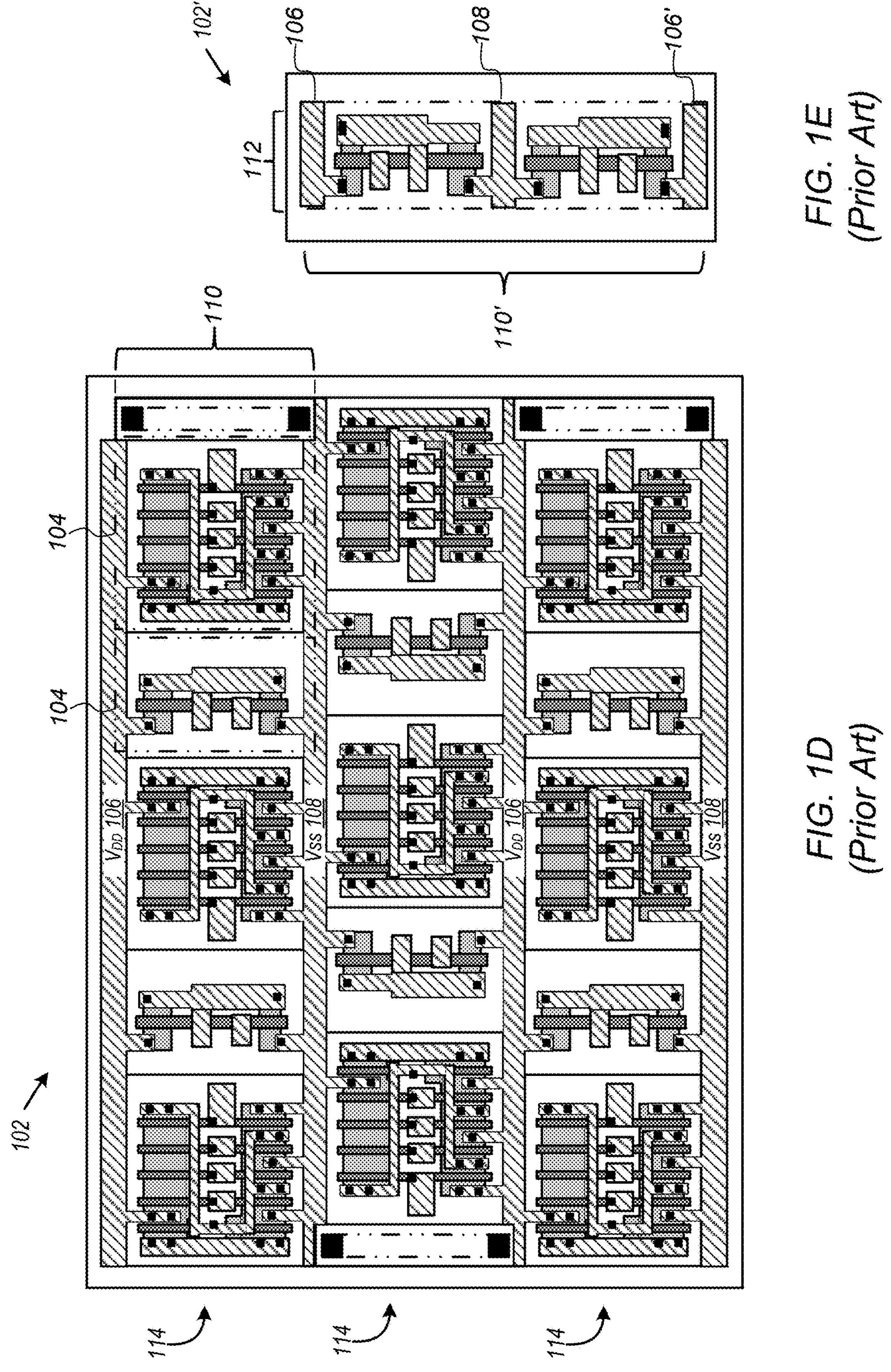
FIG. 1D is a block diagram illustrating a number of cells abutted side-by-side in rows on a substrate, and each having the same height as the template definition.
FIG. 1E is a block diagram illustrating a single multi height cell having a total height equal to a whole multiple, larger than one, of the template height of FIG. 1A.
Figure 2:
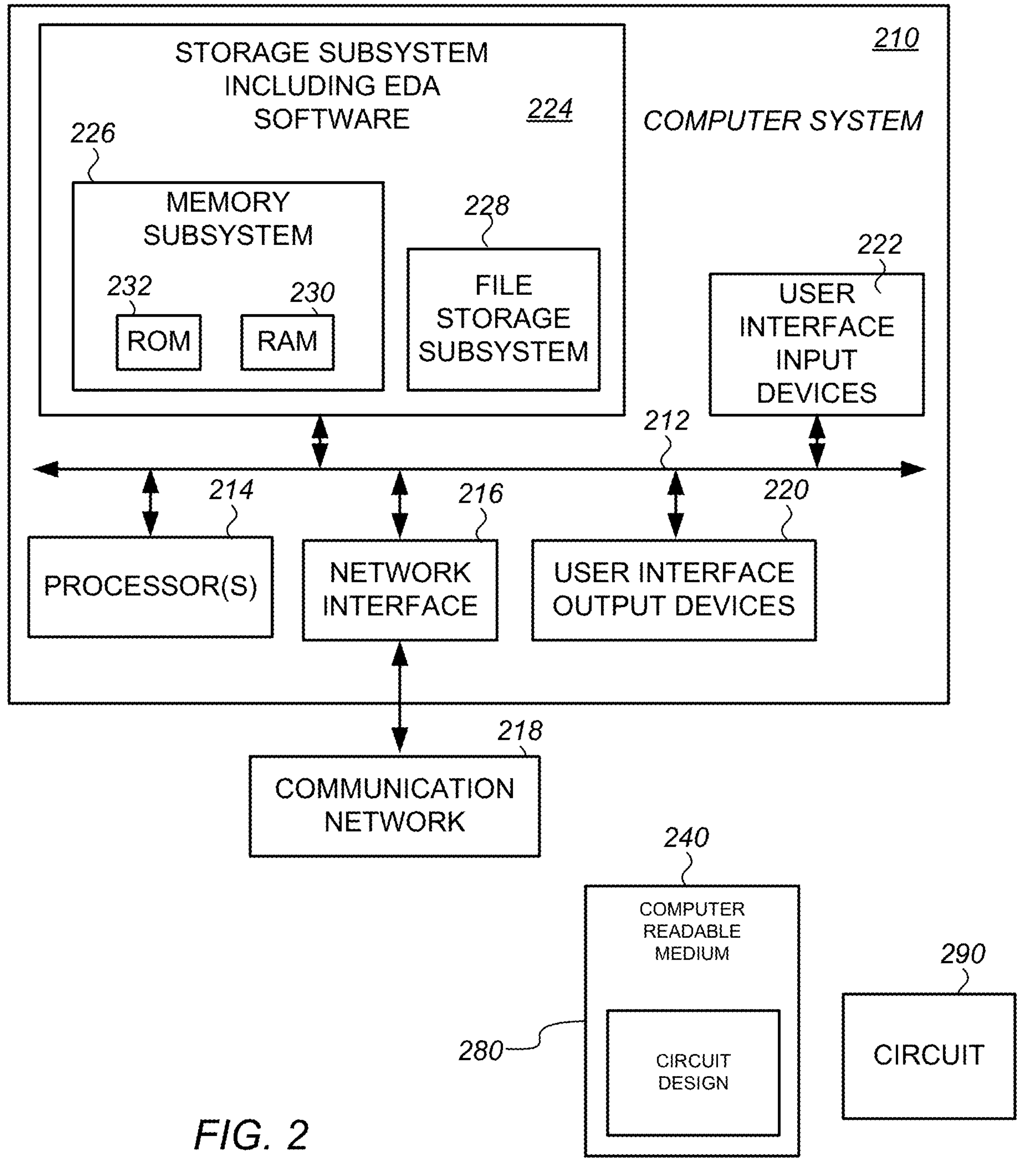
FIG. 2 is a simplified block diagram of a computer system or tool suitable for use with the EDA software and method of the present disclosure for placement and routing of intra-cell devices in ICs.

FIG. 2 is a simplified block diagram of a computer system or tool suitable for use with the EDA software and method of the present disclosure for placement and routing of intra-cell devices in ICs including multi-height cells. Referring to FIG. 2, the computer system 210 generally includes at least one processor 214 which communicates with a number of peripheral devices via bus subsystem 212. These peripheral devices may include a storage subsystem 224, comprising a memory subsystem 226 and a file storage subsystem 228, user interface input devices 222, user interface output devices 220, and a network interface subsystem 216. The input and output devices allow user interaction with computer system 210. Network interface subsystem 216 provides an interface to outside networks, including an interface to communication network 218, and is coupled via communication network 218 to corresponding interface devices in other computer systems. Communication network 218 may comprise many interconnected computer systems and communication links. These communication links may be wireline links, optical links, wireless links, or any other mechanisms for communication of information. While in one embodiment, communication network 218 is the Internet, in other embodiments, communication network 218 may be any suitable computer network.

User interface input devices 222 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 210 or onto communication network 218.

User interface output devices 220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 210 to the user or to another machine or computer system.

Storage subsystem 224 stores the basic programming and data constructs that provide the functionality of some or all of the EDA tools described herein, including the netlist reduction technology and verification tools applied for analysis of the reduced netlist. These software modules are generally executed by processor 214.

Memory subsystem 226 typically includes a number of memories including a main random access memory (RAM) 230 for storage of instructions and data during program execution and a read only memory (ROM) 232 in which fixed instructions are stored. File storage subsystem 228 provides persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem 228.

Bus subsystem 212 provides a mechanism for letting the various components and subsystems of computer system 210 communicate with each other as intended. Although bus subsystem 212 is shown schematically as a single bus, alternative embodiments of the bus subsystem may use multiple busses.

Computer readable medium 240 can be a medium associated with file storage subsystem 228, and/or with network interface subsystem 216. The computer readable medium can be a hard disk, a floppy disk, a CD-ROM, an optical medium, removable media cartridge, or electromagnetic wave. The computer readable medium 240 is shown storing a circuit design 280, including for example an HDL description of a circuit design, and a reduced netlist created with the described technology. Also shown is a circuit 290 created with the described technology.

Computer system 210 itself can be of varying types including a personal computer, a portable computer, a workstation, a computer terminal, a network computer, a television, a mainframe, or any other data processing system or user device. Due to the ever-changing nature of computers and networks, the description of computer system 210 depicted in FIG. 2 is intended only as a specific example for purposes of illustrating the preferred embodiments. Many other configurations of computer system 210 are possible having more or less components than the computer system depicted in FIG. 2.

Figure 3:
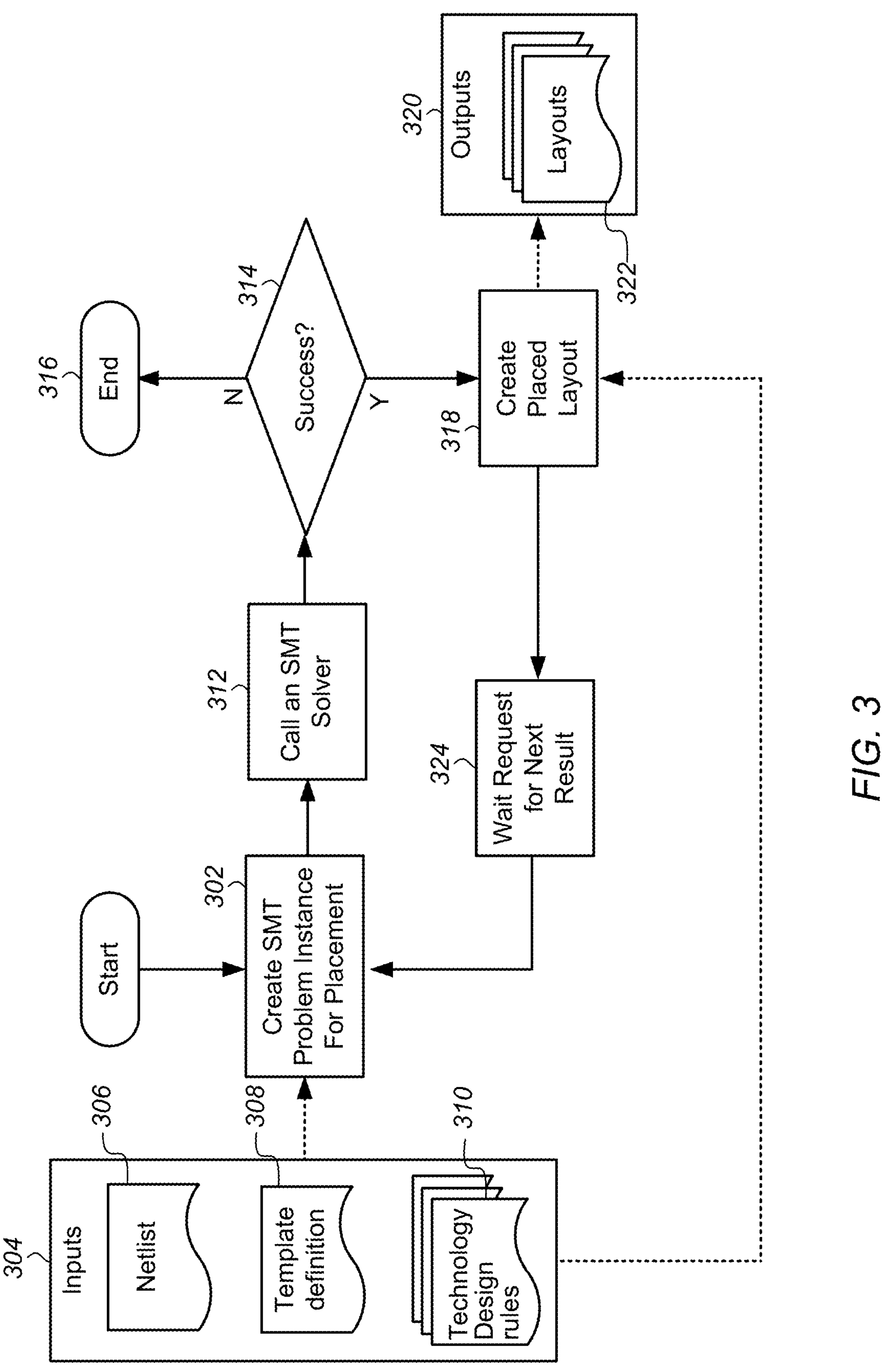
FIG. 3 is a simplified flow chart illustrating a process or method for intra-cell placement of transistors according to embodiments of the present disclosure.

A process or method for intra-cell placement of transistors according to embodiments of the present disclosure will now be described with reference to the simplified flow chart of FIG. 3. Referring to FIG. 3, the method begins by translating a potentially multi-height intra-cell transistor placement problem for a number of components or sub-circuits in the netlist into an SMT (satisfiability modulo theories) problem (step 302) from or using input provided by a designer (step 304). The inputs provided include a netlist (step 306), a template definition (step 308) and one or more technology design rules (step 310), all input through user interface input devices 222 and/or from a file storage subsystem 228. Generally, the netlist specifies parameters (including area or footprint for each component), functions and requirements for the circuit being designed and includes a list of electronic components available for use in the IC, and a list of nodes the components to which they connect. By template definition it is meant common characteristics that apply to all cells on a library, such as horizontal and vertical pitches for pin connections, cell height, and power rail characteristics, among others. The cells can include both single and multi-height cells. By multi-height cells it is meant cells with a total height equal to a whole multiple, larger than one, of the template height. That is each cell can include multiple instances of the template repeatedly formed adjacent to one another. The technology design rules specify to constraints such as timing constraints, and minimum width or spacing rules between components.

Briefly, creating a SMT problem instance for placement (step 302) includes describing the components and connectivity of the circuit in a CDL (Circuit Description Language) format file, and for each component (transistor) define a set of SMT constants, including integer and Boolean constants, which represent the position of the components over an imaginary grid. To define the grid size the designer must indicate in the inputs (netlist 306) whether the intended layout will include single or multi-height cells.

After all inputs have been entered (step 304) and the SMT problem instance for placement created (step 302), an SMT solver or subroutine is called (step 312). Briefly, the SMT problem instance includes constraints to ensure that no two components or transistors are placed on the same grid coordinates, and to analyze connectivity of the components to avoid creating short circuits. The SMT solver can include any one of a number of available SMT solvers including, for example, CVC3, MathSAT, Yices or Z3.

A minimal example of a method for creating a SMT problem instance for placement (step 302) and calling and executing a SMT solver is shown in Example A below.

Example A—Minimal Placement Example

Consider an AND2 netlist as an input, composed of 3 PMOS transistors and 3 NMOS transistors, with connectivity described by the following CDL format file snippet:

```
SUBCKT AND2 A B Z VDD VSS
*.PININFO A:I B:I Z:O VDD:P VSS:G
MT1 VDD A ZN VDD PMOS
MT2 VDD B ZN VDD PMOS
MT3 VDD ZN Z VDD PMOS
MT4 N1 A ZN VSS NMOS
MT5 VSS B NI VSS NMOS
MT6 VSS ZN Z VSS NMOS
.ENDS
```

Figure 4B:
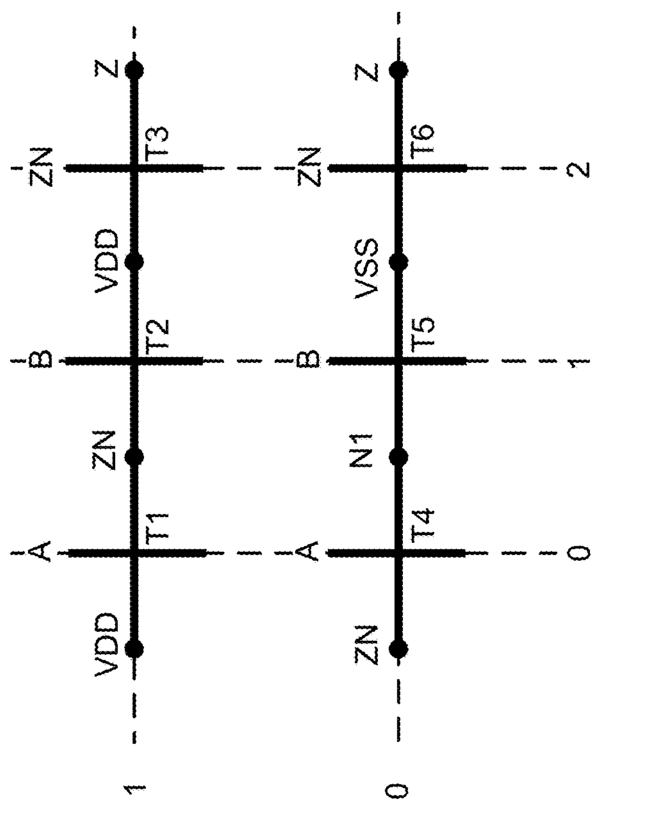
FIG. 4B is a graphical interpretation of example of model produced by an SMT solver according to the method of FIG. 3.
Figure 4A:
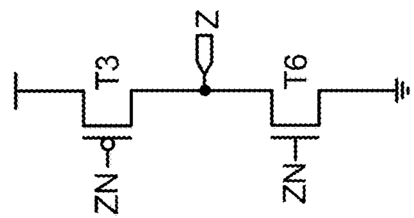
FIG. 4A is an embodiment of a schematic of a circuit for a minimal placement example according to the method of FIG. 3.

A schematic view of such a circuit is shown in FIG. 4A. Referring to

FIG. 4A, for each transistor Tn a set of SMT constants is defined: two integer constants (T_n_x and T_n_y) and one Boolean constant (T_n_f), which represent the position of the transistor over an imaginary grid and its flip state. The flip state is arbitrarily chosen to be false when the source pin of a transistor is to the left of the drain pin, and true otherwise. For the example above, the declaration of the constants in the SMT2 file format would look like:

```
(declare-const T_1_x Int)
(declare-const T_1_y Int)
(declare-const T_1_f Bool)
(declare-const T_2_x Int)
(declare-const T_2_y Int)
(declare-const T_2_f Bool)
(declare-const T_3_x Int)
(declare-const T_3_y Int)
(declare-const T_3_f Bool)
(declare-const T_4_x Int)
(declare-const T_4_y Int)
(declare-const T_4_f Bool)
(declare-const T_5_x Int)
(declare-const T_5_y Int)
(declare-const T_5_f Bool)
(declare-const T_6_x Int)
(declare-const T_6_y Int)
(declare-const T_6_f Bool)
```

To ensure proper placement of the transistors, it is asserted that all X and Y positions will be within the predefined grid limits. To define a grid size, one must choose whether the intended layout will be single or multi-height.

As an example of single height placement formulation, define that all NMOS transistors will be placed over the row 0 and all PMOS transistors over the row 1. Furthermore, define that the cell will have no more than 3 columns of transistors, since it is known beforehand that this is enough for this circuit. The process of finding such a limit could be implemented as an optimization either using an optimization extension to the SMT2 language, or by iterating externally.

In this situation, the following SMT2 code will be produced:

```
(assert(and(>=T_1_x 0)(<=T_1_x 2)))
(assert(and(>=T_2_x 0)(<=T_2_x 2)))
(assert(and(>=T_3_x 0)(<=T_3_x 2)))
(assert(and(>=T_4_x 0)(<=T_4_x 2)))
(assert(and(>=T_5_x 0)(<=T_5_x 2)))
(assert(and(>=T_6_x 0)(<=T_6_x 2)))
(assert(=T_1_y 1))
(assert(=T_2_y 1))
(assert(=T_3_y 1))
(assert(=T_4_y 0))
(assert(=T_5_y 0))
(assert(=T_6_y 0))
```

Another example could be of a dual height cell in which NMOS transistors will be either on row 0 or 3, and PMOS transistors on rows 1 or 2. In this case, the minimum number of columns needed is 2, producing the following SMT2 code:

```
(assert(and(>=T_1_x 0)(<=T_1_x 1)))
(assert(and(>=T_2_x 0)(<=T_2_x 1)))
(assert (and(>=T_3_x 0)(<=T_3_x 1)))
(assert(and(>=T_4_x 0)(<=T_4_x 1)))
(assert(and(>=T_5_x 0)(<=T_5_x 1)))
(assert(and(>=T_6_x 0) (<=T_6_x 1)))
(assert(or(=T_1_y 1)(=T_1_y 2)))
(assert(or(=T_2_y 1)(=T_2_y 2)))
(assert(or(=T_3_y 1)(=T_3_y 2)))
(assert(or(=T_4_y 0)(=T_4_y 3)))
(assert(or(=T_5_y 0)(=T_5_y 3)))
(assert(or(=T_6_y 0)(=T_6_y 3)))
```

Then, the following SMT2 code makes sure no two transistors will be placed on the same coordinates. Since PMOS and NMOS transistors do not share rows, they cannot overlap, so all pairs of same type transistors are asserted to be in distinct positions:

```
(assert(not(and(=T_1_x T_2_x)(=T_1_y T_2_y))
(assert(not(and(=T_1_x T_3_x)(=T_1_y T_3_y))))
(assert(not(and(=T_2_x T_3_x)(=T_2_y T_3_y))
(assert(not(and(=T_4_x T_5_x)(=T_4_y T_5_y)))
(assert(not(and(=T_4_x T_6_x)(=T_4_y T_6_y)
(assert(not(and(=T_5_x T_6_x)(=T_5_y T_6_)
```

And finally, in order to avoid creating short circuits, the connectivity of the transistors is analyzed and the following SMT2 code makes sure that, for the given circuit, it is recommended to only abut laterally transistors when the shared diffusion belongs to the same net:

```
(assert(implies(and(=T_1_y T_2_y)(=T_1_x(+T_2_x 1)))
    (not (=T_1_f T_2_f))))
```

```
(assert(implies(and(=T_1_y T_2_y)(=T_2_x(+T_1_x 1)))
   (not (=T_1_f T_2_f))))
(assert(implies(and(=T_1_y T_3_y)(=T_1_x(+T_3_x 1)))
   (and (not T_1_f) T_3_f)))
(assert(implies(and(=T_1_y T_3_y)(=T_3_x(+T_1_x 1)))
   (and T_1_f (not T_3_f))))
(assert(implies(and(=T_2_y T_3_y)(=T_2_x(+T_3_x 1)))
   (and (not T_2_f) T_3_f)))
(assert(implies(and(=T_2 y T_3_y)(=T_3_x(+T_2_x 1)))
   (and T_2_f (not T_3_f))))
(assert(implies(and(=T_4_y T_5_y)(=T_4_x(+T_5_x 1)))
   (and (not T_4_f) (not T_5_f))))
(assert(implies(and(=T_4_y T_5_y)(=T_5_x(+T_4_x 1)))
   (and T_4_f T_5_f)))
(assert(not(and(=T_4_y T_6_y)(=T_4_x(+T_6_x 1)))))
(assert(not(and(=T_4_y T_6_y)(=T_6_x(+T_4_x 1)))))
(assert(implies(and(=T_5_y T_6_y)(=T_5_x(+T_6_x 1)))
   (and(not T_5_f) T_6_f)))
(assert(implies(and(=T_5_y T_6_y)(=T_6_x(+T_5_x 1)))
   (and T_5_f(not T_6_f))))
```

Additional constraints can optionally be encoded, either restricting types of unwanted solutions or to reduce the symmetry of the problem. For example, the following SMT2 code asserts that, for this circuit, vertically neighboring PMOS and NMOS transistors must share the gate net:

```
(assert(and(=T_1_x T_4_x)(=(abs(−T_1_y T_4_y))1)))
(assert(and(=T_2_x T_5_x)(=(abs(−T_2_y T_5_y))1)))
(assert(and(=T_3_x T_6_x)(=(abs(−T_3_y T_6_y))1)))
```

After collecting the results from an SMT solver, one can evaluate the produced model to find coordinates and flip state for each transistor, which together with its dimensions and the grid definition can define a placed layout of the given circuit.

An example of model produced by an SMT solver for the single height formulation above could be:

```
(model
(define-fun T_1_f( )Bool false)
(define-fun T_1_x( )Int 0)
(define-fun T_1_y( )Int 1)
(define-fun T_2_f( )Bool true)
(define-fun T_2_x( )Int 1)
(define-fun T_2_y( )Int 1)
(define-fun T_3_f( )Bool false)
(define-fun T_3_x( )Int 2)
(define-fun T_3_y( )Int 1)
(define-fun T_4_f( )Bool true)
(define-fun T_4_x( )Int 0)
(define-fun T_4_y( )Int 0)
(define-fun T_5_f( )Bool true)
(define-fun T_5_x( )Int 1)
(define-fun T_5_y( )Int 0)
(define-fun T_6_f( )Bool false)
(define-fun T_6_x( )Int 2)
(define-fun T_6_y( )Int 0))
```

Which can be graphically interpreted as shown in FIG. 4B.

Figure 4A:
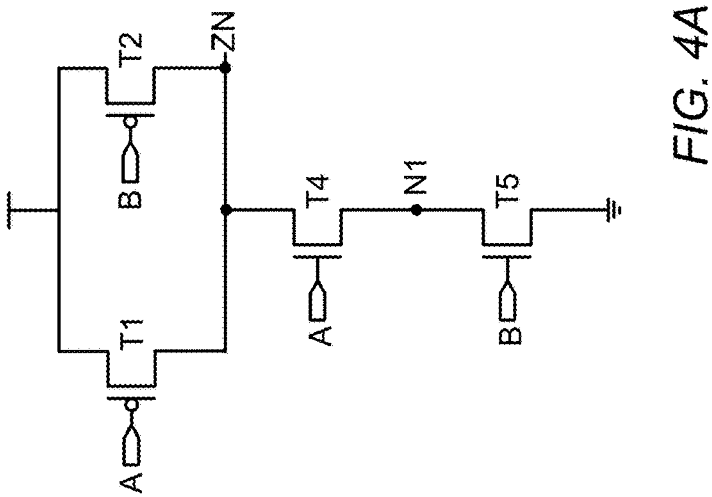

Next, referring again to FIG. 3 a determination is made whether or not a solution by the SMT solver was successful (step 314). If it was not the method for intra-cell placement is ended (step 316). If however the identified solution was successful, that is none of the components overlap or require connections that result in a short circuit, a placed layout is created (step 318) using the netlist, template definitions and technology design rules previously provided in the input step (step 304), and provided in an output step (step 320) through a user interface output device 220 to the designer and/or through a network interface subsystem 216 as an input to a module or subroutine for implementing a method for intra-cell routing, described below with reference to FIG. 4. Generally, as shown in FIG. 3 the placed layout 322 can be one of a number of layouts provided to the module or subroutine for intra-cell routing.

The EDA software then waits for the next number of components or sub-circuits in the netlist (step 324) and the process continues by creating an SMT problem instance for placement (step 302) for a next circuit or number of components in the netlist 306 with the added input of the previously created placed layout 322.

Figure 5:
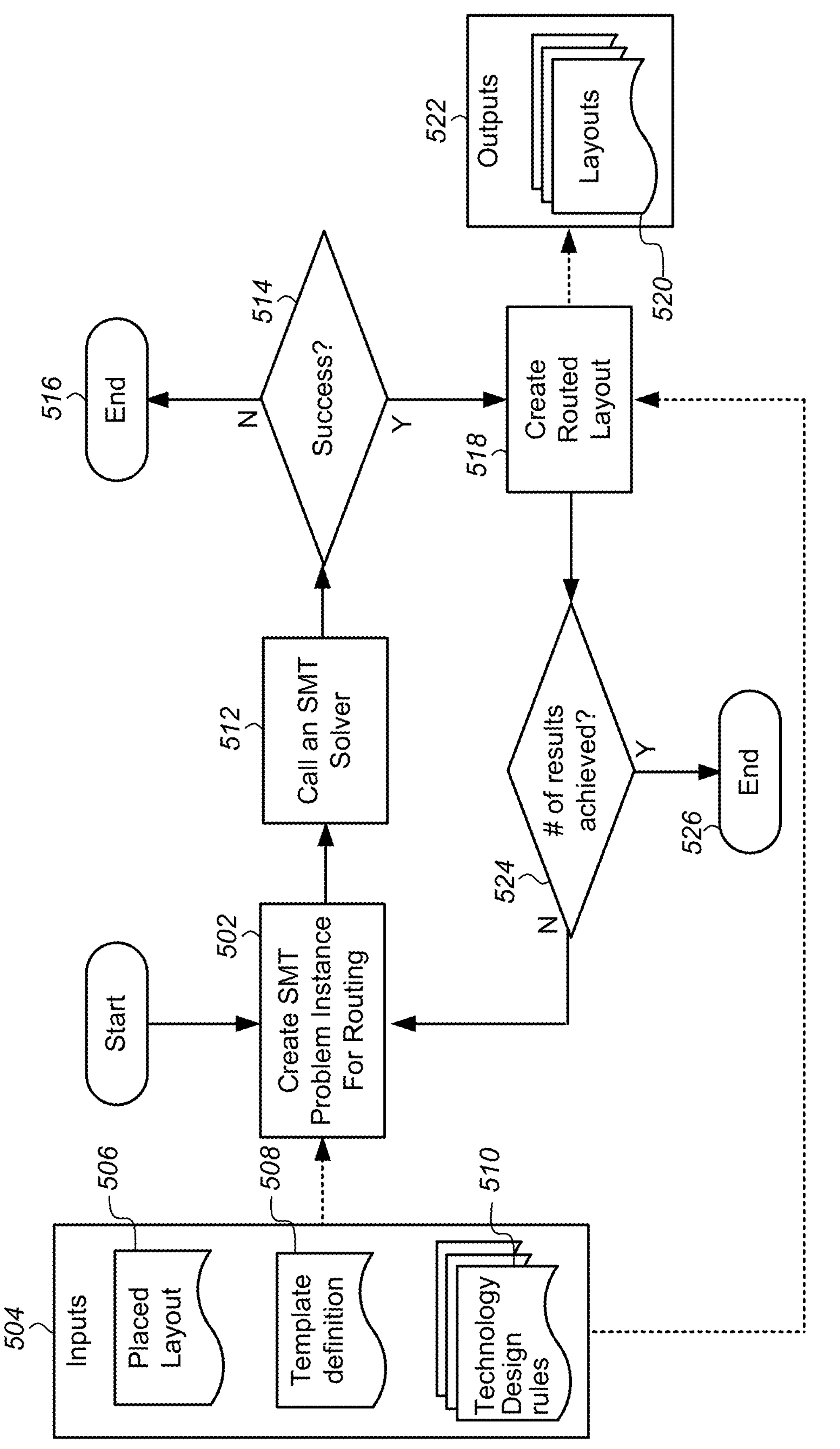
FIG. 5 is a simplified flow chart illustrating a process or method for intra-cell routing in a cell according to embodiments of the present disclosure.

A process or method for intra-cell routing in a cell including multi-height components according to embodiments of the present disclosure will now be described with reference to the simplified flow chart of FIG. 5. Referring to FIG. 5, the method begins by translating a routing problem for a placed layout in a design including a number of multi-height components or transistors into an SMT problem instance for routing (step 502) from or using as inputs (step 504), and executing or calling an SMT solver or subroutine (step 512). Briefly, the SMT problem instance contains constraints to ensure all terminals of the same net will be connected, but no different nets will be connected, avoiding a short-circuit. It also may include code to enforce design rules on the final routed layout. Inputs can include a placed layout (step 506) derived using the method of FIG. 3, and inputs provided by a designer including template definitions (step 508) and one or more technology design rules (step 510). As with the method of FIG. 3 described above, all inputs are provided or entered through user interface input devices 222 and/or from a file storage subsystem 228.

A minimal example of a method for creating a SMT problem instance for routing (step 502) and calling and executing a SMT solver (step 512) is shown in Example B below.

Example B—Minimal Routing Example

Figure 6A:
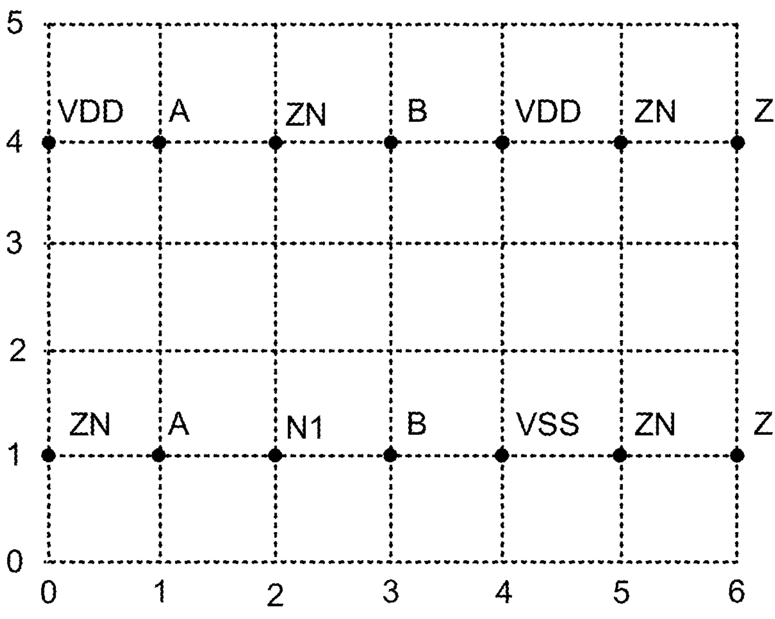
FIG. 6A is an embodiment of a placed layout and the routing grid for a minimal routing example according to the method of FIG. 5.

Given a layout with placed transistors, the first step is to define a grid compatible with the routing resources available. An example of a placed layout and the routing grid is shown in FIG. 6A.

Let each crossing of this grid be referred to as a node, each dotted line connecting two crossings an edge, and each connection point marked with a dot a terminal.

In this example, the grid was chosen such that it can have one transistor every two columns. The topmost and bottommost rows are reserved to power, and there are four 4 inner routing tracks.

In this example there are routing layers in Polysilicon and Metal-1, so this grid is replicated twice and stacked, also creating edges in between nodes across layers, representing the Via layer. This way, any node can be referred as a 3D point in a coordinate system as (x, y, z), where x represents the column, y the row and z the layer. In this example, layer 0 is Polysilicon and layer 1 is Metal-1. Any edge crossing from layer 0 to layer 1 will become a shape in the Via layer.

Conversely, each edge can be referred by three coordinates and a direction (north, south, east, west, up, down). For instance, the edge (x, y, z, up) represents the edge between the node (x, y, z) and the node (x, y, z+1), or the edge (x, y, z, west) represents the edge connecting nodes (x−1, y, z) and (x, y, z). By this definition, there exists an edge connecting two nodes $(x_1, y_1, z_1)$ and $(x_2, y_2, z_2)$ if, and only if, one of the following criteria is true:

|x1−x2|=1 and y1=y2 and z1=z2 x1=x2 and |y1−y2|=1 and z1=z2 x1=x2 and y1=y2 and |z1−z2|=1

Nets are indexed by integer values arbitrarily, being 0 reserved for "no net". In this example, a possible representation is: {0: no_net, 1: VDD, 2: VSS, 3: A, 4: B, 5: N1, 6: ZN, 7: Z}.

If a net has more than 2 terminals, it is recommended to further break the net down into subnets that connect pairs of terminals in such a way that all terminals are joined by subnets. The minimum number of subnets needed for a net is one less than the number of terminals of that net. These subnets are also arbitrarily indexed by integer values. As an example, net ZN has four terminals: {(0, 1, 0), (2, 4, 0), (5, 1, 0), (5, 4, 0)}. A possible set of subnets is: {0: {(0, 1, 0), (2, 4, 0)}, 1: {(2, 4, 0), (5, 1, 0)}, 2: {(5, 1, 0), (5, 4, 0)}}.

For each edge on the grid a set of SMT constants will be created: a Boolean constant E_used representing if there exist a wire over the given edge, an integer constant E_net representing which net is being routed by the edge (if used), and a bitvector constant E_subnet representing which subnets of E_net are being routed by the edge (if used). Follow an example of SMT2 code for one generic edge, where the maximum number of subnets for a net is 4:

```
(declare-const E_used Bool)
(declare-const E_net Int)
(declare-const E_subnet (BitVec 4))
```

The net variable has limited valid values, so there are clauses to restrict them. The net can vary between 0 and the number of nets (7 in our example). Follow an example of SMT2 code that defines these limits for each edge:

```
(assert(and(>=E_net 0)(<=E_net 7)))
```

For each edge, if there is a net associated to it, then that edge must be used:

```
(assert(implies(>E_net 0)E_used))
```

To ensure that there is no edge associated to a subnet without being associated to a net, the following clause must be added for every edge:

```
(assert(implies(not(=E_subnet #b0000))(>E_net 0)))
```

Now the connectivity must be encoded as well. For that it is recommended to look at two different cases: If node is a terminal of subnet, then the number of edges connected to node in which E_subnet contains subnet is exactly 1. As an example, consider a generic node with 3 connected edges (E1, E2 and E3), which is a terminal of net 7 and subnet 0. This could be encoded in SMT2 as:

```
(assert (let
((e1(ite(and(=E1_net 7)(=(bvand E1_subnet #b0001)
  #b0001))1 0))
(e2(ite(and(=E2_net 7)(=(bvand E2_subnet #b0001)
  #b0001))1 0))
(e3(ite(and(=E3_net 7)(=(bvand E3_subnet #b0001)
  #b0001))1 0)))
(=(+e1 e2 e3) 1)))
```

If node is not a terminal of subnet, then the number of edges connected to node in which E_subnet contains subnet is either 2 or 0. Following the same example as before, consider now that the node in question is not a terminal for net 7 and subnet 0.

```
(assert (let
((e1(ite(and(=E1_net 7)(=(bvand E1_subnet #b0001)
  #b0001))1 0))
(e2(ite(and(=E2_net 7)(=(bvand E2_subnet #b0001)
  #b0001))1 0))
(e3(ite(and(=E3_net 7)(=(bvand E3_subnet #b0001)
  #b0001))1 0)))
(or(=(+e1 e2 e3)0)(=(+e1 e2 e3)2)))
```

Finally, to avoid short circuits from happening one must make sure that if two used edges meet, then they need to be assigned to the same net. As an example, consider a node with 3 edges connected to it. A possible manner to encode this in SMT2 is:

```
(assert(implies E1_used(and
(implies E2_used(=E_2_net E1_net))
(implies E3_used(=E_3_net E1_net)))))
(assert implies E2_used(and
(implies E_used(=E_1_net E2_net))
(implies E3_used(=E_3_net E2_net)))))
(assert(implies E3_used(and
(implies E1_used(=E_1_net E3_net))
(implies E2_used(=E_2_net E3_net)))))
```

Additional restrictions, such as design rules or template definitions, can be similarly encoded. An example of that could be the definition of power rails in metal 1. In this instance, every horizontal edge in the topmost row in layer 1 must be in net 1:

```
(assert(=E_net 1))
```

After sending the problem instance to an SMT solver engine, one can interpret the results by looking at the "used" variables of each edge, which if true indicates the presence of a wire in between the positions corresponding to the nodes defining that edge.

The results, although correct, can have poor metrics, such as wirelength. After ensuring a solution exists, one has the option of using an optimization engine to tune the results according to predefined cost functions, as desired.

Finally, ports can be easily representable by adding an extra layer with only one node connected to all nodes from the layer immediately below. This new layer is exempt from the constraints of short circuit.

Figures 6B, 6C, 6D:
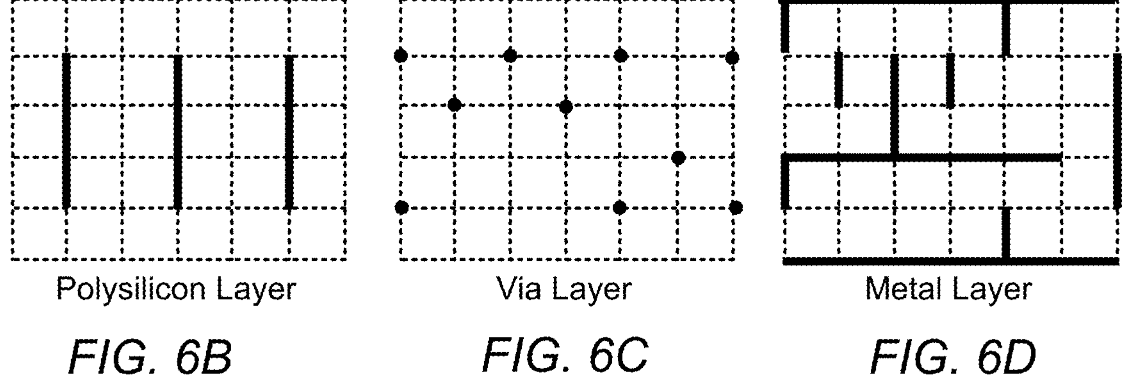
FIG. 6B is illustrates a layout of a polysilicon layer for a minimal routing example according to the method of FIG. 5.
FIG. 6C shows placement of vias in a via layer for a minimal routing example according to the method of FIG. 5.
FIG. 6D shows a layout of a metal layer for a minimal routing example according to the method of FIG. 5.

One example of output for the complete example can be interpreted graphically shown in FIGS. 6B through 6D, where FIG. 6B shows a layout of a polysilicon layer; FIG. 6C shows placement of vias in a via layer; and FIG. 6D shows a layout of a metal layer.

Next, referring again to FIG. 5 a determination is made whether or not a solution by the SMT solver was successful (step 514). If it was not the method for intra-cell routing is ended (step 516). If however the identified solution was successful, that is all the required terminals are connected and no connection that results in a short circuit exists, a routed layout is created (step 518) using the placed layout, template definitions and technology design rules previously entered in the input step (step 504), and a placed and routed layout 520 provided in an output buffer 522 through a network interface subsystem 216. Generally, as shown in FIG. 5 the placed and routed layout 520 can be one of a number of layouts stored in the output buffer 522.

The EDA software then determines whether or not a desired number of results (placed and routed layouts 520) has been achieved (step 524), and if not the SMT problem instance for routing (step 502) is repeated for another placed layout 506, derived using the method of FIG. 3. If the desired number of results is achieved the intra-cell routing is complete and the process is ended (step 526). The placed and routed layouts 520 can then be output to the designer through the user interface output device 220 and/or through a network interface subsystem 216 to computer readable medium 240 as a readable medium as a standard cell library used during the synthesis of designs during the IC design process.

Figure 7:
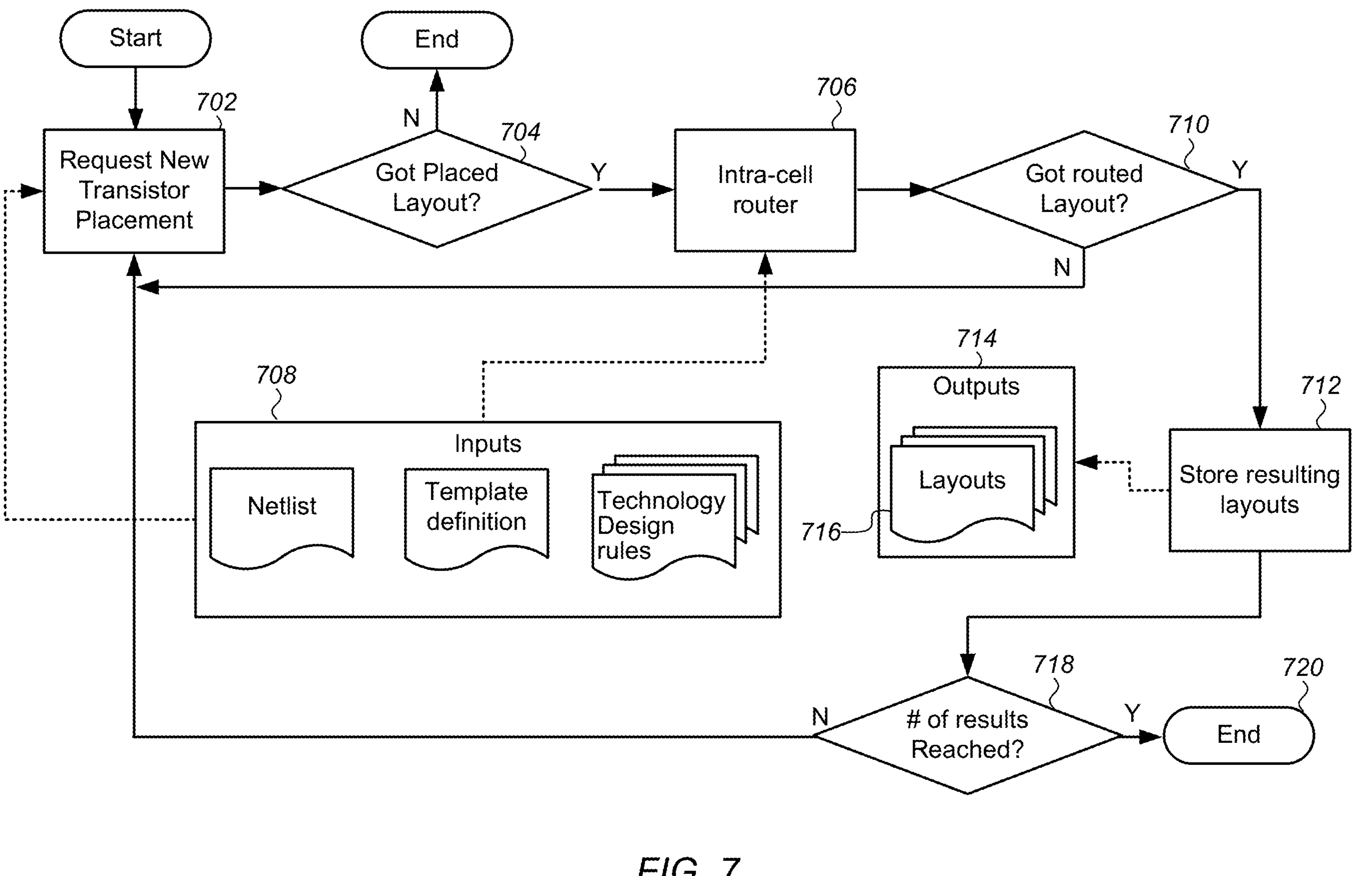
FIG. 7 is a simplified flow chart illustrating the overall process or method for intra-cell placement of transistors and intra-cell routing in a cell according to embodiments of the present disclosure.

FIG. 7 is a simplified flow chart illustrating the overall process or method for intra-cell placement of transistors and intra-cell routing in a cell including multi-height components according to embodiments of the present disclosure. Referring to FIG. 7, the method begins with a request for a new transistor placement (step 702), which is accomplished using the method of FIG. 3. Next, if the placed layout is complete (step 704), the intra-cell routing (step 706) of the placed layout is accomplished using the placed layout, template definitions and technology design rules previously entered in the input step (step 708) of the method of FIGS. 3 and/or 4. If the placed layout is not complete the process ends. Next, a determination is then made if the routed layout for the new transistor placement is complete (step 710). If it is not a new transistor placement is requested (step 702). If the routed layout is complete, the results are stored (step 712) in an output step (step 714), and a determination is made if the desired number of results, i.e., layouts 716, has been achieved (step 718), and if not a new transistor placement is requested (step 702) and the process repeated for another placed layout. If the desired number of results is achieved the process is ended (step 720).

Other embodiments of an overall process or method for automated placement and routing of intra-cell transistors in an integrated circuit (IC) using program instructions stored in a non-transitory computer-readable media and executed using at least one processor will now be described with reference to FIGS. 8 and 10.

Figure 8:
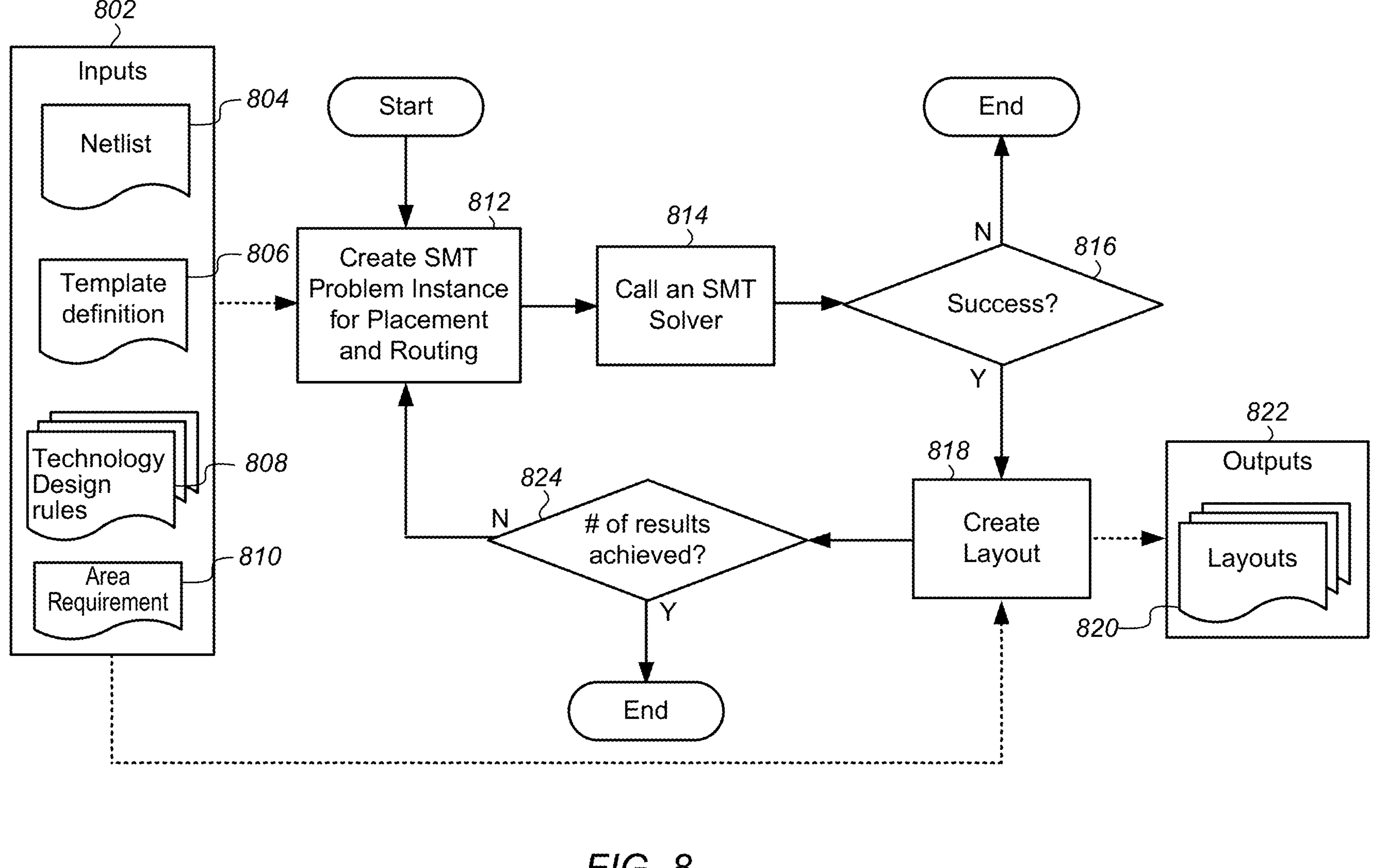
FIG. 8 is a simplified flow chart illustrating a process or method for integrated placement and routing in a cell according to embodiments of the present disclosure.

FIG. 8 is a simplified flow chart illustrating a process or method for integrated placement and routing in a cell according to embodiments of the present disclosure. Referring to FIG. 8 the method begins with receiving inputs 802 including a netlist 804, template definitions 806 and one or more technology design rules 808. Optionally or preferably, the inputs can further include a predetermined area requirement 810 specified by a circuit designer or user. As with the embodiments described above all inputs can be entered through user interface input devices 222 and/or from a file storage subsystem 228. Generally, the netlist specifies functions and requirements for the circuit being designed and includes a list of electronic components, and a list of nodes the components to which they connect. By template definition it is meant common characteristics that apply to all cells on a library, such as horizontal and vertical pitches for pin connections, cell height, and power rail characteristics, among others. The cells can include both single and multi-height cells. By multi-height cells it is meant cells with a total height equal to a whole multiple, larger than one, of the template height. That is each cell can include multiple instances of the template repeatedly formed adjacent to one another. The technology design rules specify to constraints such as minimum width or spacing rules between components.

After all inputs have been entered a single SMT problem instance for both placement and routing is created (step 812). Briefly, creating a SMT problem instance for placement and routing includes translating or describing the components and connectivity of the circuit in a CDL (Circuit Description Language) format file, and for each component (transistor) define a set of SMT constants, including integer and Boolean constants, which represent the position of the components over an imaginary grid. To define the grid size the designer must indicate in the inputs (netlist 804) whether the intended layout will include single or multi-height cells. It also includes code that ensures proper connectivity and technology design rules that need to be followed.

A minimal example of a method for creating an SMT problem instance for placement and routing is shown in Example C below.

Example C—Minimal Integrated Placement and Routing Example

In this example, the objective is to fuse ordering and routing problems into a single SMT problem. Thus, given an input netlist, an SMT solver may either produce a placed and routed cell, or prove it is impossible to achieve such result with the current netlist, routing grid, and technology-dependent parameters.

The main idea is to connect both ordering and routing algorithms (presented in Examples A and B) in such a way which whenever a transistor is placed at a location by the ordering constraints, the routing constraints recognize it and ensure the routing of its terminals. To make this connection, the same ordering constraints presented in Example A are used, plus special constants and constraints which are used for routing. The constants are defined at every position where the ordered transistor terminals could be placed in the routing grid. These positions will be referred to as terminal candidates. Using the same routing grid as in Example B, an example of definition of terminal candidates shown in FIG. 9.

Figure 9:
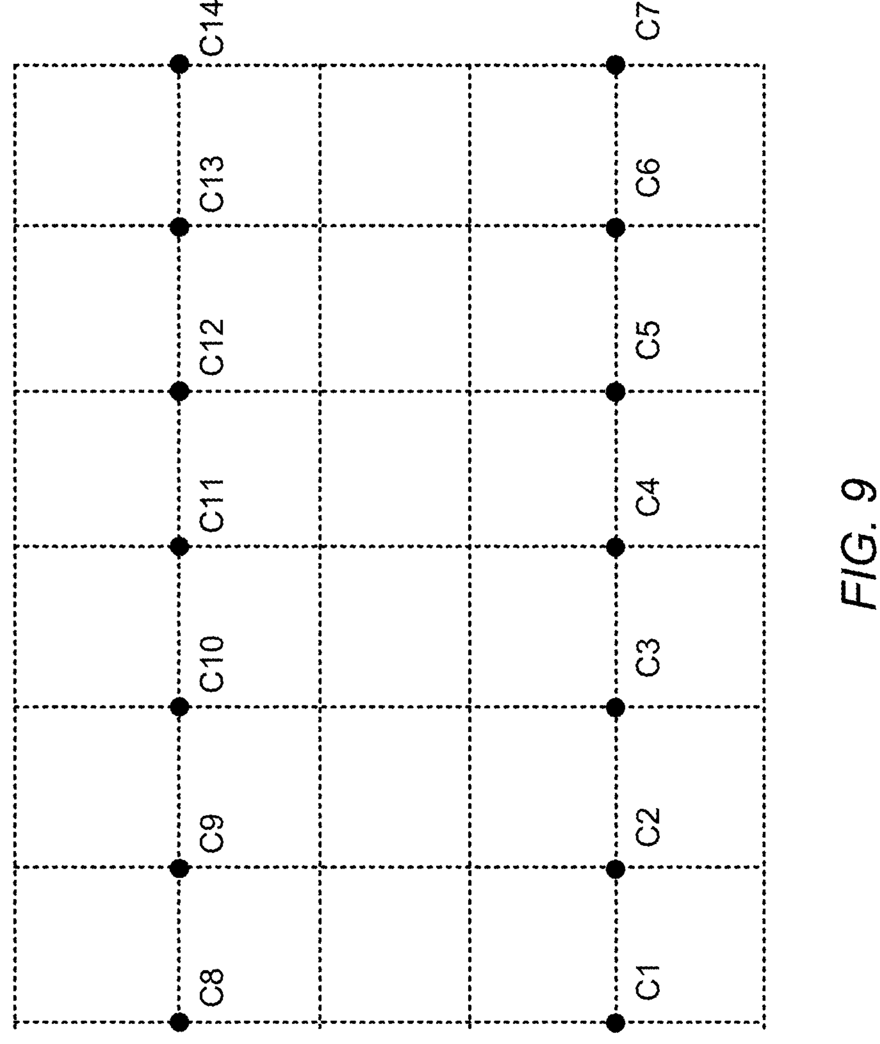
FIG. 9 is an embodiment of a routing grid of terminal candidates for a minimal integrated placement and routing example according to the method of FIG. 8.

Referring to FIG. 9, in this example, positions C1, C3, C5, C7, C8, C10, C12, and C14 are diffusion terminals and, the remaining positions are polysilicon terminals. For each terminal candidate, an integer constant is defined which indicates its current net.

```
(declare-const C1_net Int)
(declare-const C2_net Int)
(declare-const C3_net Int)
(declare-const C4_net Int)
(declare-const C5_net Int)
(declare-const C6_net Int)
(declare-const C7_net Int)
(declare-const C8_net Int)
(declare-const C9_net Int)
(declare-const C10_net Int)
(declare-const C11_net Int)
(declare-const C12_net Int)
(declare-const C13_net Int)
(declare-const C14_net Int)
```

Additionally, integer constants are required indicating which transistor is associated with each polysilicon terminal candidate:

```
(declare-const C2_xtor Int)
(declare-const C4_xtor Int)
(declare-const C6_xtor Int)
(declare-const C9_xtor Int)
(declare-const C11_xtor Int)
(declare-const C13_xtor Int)
```

The transistors are then connected with ordering constants. For example, when transistor MT1 is placed at ordering position (0, 0) and not flipped, C2_xtor must be MT1, C1_net must be net VDD (net index 1), C2_net must be net A (net index 3), C3_net must be ZN (net index 6). And:

```
(assert(implies(and(=T_1_x 0)(=T_1_y 0)(=T_1_f false))
  (and(=C2_xtor 1)(=C1_net 1)(=C2_net 3)(=C3_net 6)))
```

Similarly, when MTI is in the same position, but flipped:

```
(assert(implies(and(=T_1_x 0)(=T_1_y 0)(=T_1_f true))
  (and(=C2_xtor 1)(=C1_net 6)(=C2_net 3)(=C3_net 1)))
```

When MT1 is in position (1, 0), the terminals are mapped to C3, C4 and C5:

```
(assert(implies(and(=T_1_x 1)(=T_1_y 0)(=T_1_f false))
  (and(=C4_xtor 1)(=C3_net 1)(=C4_net 3)(=C5_net 6))
(assert(implies(and(=T_1_x 1)(=T_1_y 0)(=T_1_f true))
  (and(=C4_xtor 1)(=C3_net 6)(=C4_net 3)(=C5_net 1)))
```

To cover all the possible orderings, a similar constraint must be created for every transistor, connecting it to each candidate terminals it can occupy.

As for the routing constraints, the same constraints as shown in Example B are used, except for two differences: (1) subnets are generated based on transistors, instead of placed terminals; (2) connectivity constraints depend on candidate terminal constants.

If a net appears in more than 2 transistors in the input netlist, the net is further broken down into subnets that connect pairs of transistors in such a way that all transistors are joined by subnets. The minimum number of subnets needed for a net is one less than the number of transistors which contain that net as a terminal. These subnets are also arbitrarily indexed by integer values. As an example, net ZN appears in five transistors: {MT1, MT2, MT3, MT4, MT6}. A possible set of subnets is: {0: {MT1, MT2}, 1: {MT2, MT3}, 2: {MT4, MT6}, 3: {MT3, MT6}}.

For each node which is not a terminal candidate the constraint which determines the degree of the edges of the node with respect to every subnet remains the same as Example B: the degree must be either zero or two. For terminal candidate nodes, on the other hand, the degree definition is based on the net which is assigned to that terminal by the ordering constraints. For any subnet s, the degree of a candidate node with respect to s must be one if the terminal is assigned with the net and a transistor which belongs to s. For any other candidate node which does not fit this description, the degree with respect to s must be zero or two.

As an example, consider the subnet degree constraint on polysilicon terminal candidate C2 for net A (net index 3) and subnet between transistors MT1 and MT4. The degree must be one if C2 is assigned with net A and either transistor MT1 or MT4. Otherwise, the degree must be zero or two.

```
(assert(let
((subnet_degree(+
;edge to the west of C2
(ite(and(=E_010_110_net 3)(=(bvand E_110_210_subnet
   #b0001) #b0001))10);
;edge to the south of C2
(ite(and(=E_100_110_net 3)(=(bvand E_200_210_subnet
   #b0001) #b0001))1 0);
;edge to the east of C2
(ite(and(=E_110_210_net 3)(=(bvand E_210_310_subnet
   #b0001) #b0001))1 0);
;edge to the north of C2
(ite(and(=E_110_120_net 3)(=(bvand E_210_220_subnet
   #b0001) #b0001))1 0);
;via connecting C2 to the layer above
(ite(and(=E_110_111_net 3)(=(bvand E_210_211_subnet
   #b0001) #b0001))1 0)))
(ite(and(=C2_net 3)(or(=C2_xtor 1)(=C2_xtor 4))
(=subnet_degree 1)
(or(=subnet_degree 0)(=subnet_degree 2)))))
```

Here, E_ijk_xyz_net denotes the net constant associated with the edge which connects nodes at positions (i.j.k) and (x,y,z). E_ijk xyz_subnet is the subnet constant associated with the same edge.

Special care must be taken when dealing with diffusion terminals, since it is not necessary to route diffusion sharing cases. The following example defines subnet degree on terminal candidate for net N1 (net index 5) and the subnet between transistors MT4 and MT5. If the transistor to the left (C2_xtor) is MT4 and the right one (C4_xtor) is MT5, or vice-versa, then, this is a diffusion sharing case and, therefore, it is not required to route this subnet, the subnet degree is zero or two. The only case where this subnet is required to be routed is when only one of the transistors of the subnet is connected to the current diffusion.

```
(assert(let
((subnet_degree(+
;edge to the west of C3
(ite(and(=E_110_210_net 5)(=(bvand E_110_210_subnet
   #b0001) #b0001))1 0)
;edge to the south of C3
(ite(and(=E_200_210_net 5)(=(bvand E_200_210_subnet
   #b0001) #b0001))1 0)
;edge to the east of C3
(ite(and(=E_210_310_net 5)(=(bvand E_210_310_subnet
   #b0001) #b0001))1 0)
;edge to the north of C3
(ite(and(=E_210_220_net 5)(=(bvand E_210_220_subnet
   #b0001) #b0001))1 0)
;via connecting C3 to the layer above
(ite(and(=E_210_211_net 5)(=(bvand E_210_211_subnet
   #b0001) #b0001))1 0))))
(ite(and(=C3_net 5)
(=(+(ite(or(=C2_xtor 4)(=C4_xtor 4)))
(ite(or(=C2_xtor 5)(=C4_xtor 5))))
1))
(=subnet_degree 1)
(or(=subnet_degree 0)(=subnet_degree 2)))))
```

To ensure every net will be routed correctly, a similar subnet constraint must be created for each terminal candidate with each subnet of each net of the input netlist.

Once a solution is found by an SMT solver, the ordering and routing result can be interpreted by reading the result of the constants the same way as explained in Examples A and B.

After all inputs 802 have been entered, and the SMT problem instance for placement and routing created (step 812), an SMT solver or subroutine is called and a solution generated (step 814). Briefly, the SMT solver includes constraints to ensure that no two components or transistors are placed on the same grid coordinates, and to analyze connectivity of the components to avoid creating short circuits.

Next, a determination is made whether or not a solution by the SMT solver was successful (step 816). The solution is successful if it satisfies requirements of the inputs and a predetermined area requirement specified by a user. If it was not successful the method is ended, and the user notified. If however the identified solution was successful, that is none of the components overlap or require connections that result in a short circuit, a layout 820 for the IC including both placed and routed intra-cell transistors is created (step 818) using the netlist, template definitions and technology design rules previously provided, and output in an output step (step 822) through a user interface output device 220 to the designer.

In some embodiments, once a solution satisfying requirements of the inputs and the predetermined area requirement is found the layout relating to the solution is communicated to the user, and the method ends and the SMT solver is not called again in an attempt to find another, more optimal solution satisfying the requirements of the input and the predetermined area requirement.

In other embodiments, as shown in FIG. 8, the placed layout 820 is one of a number of layouts created and output to the user in the output step (step 822). Generally, in these embodiments after a layout is created (step 818) a determination is made if the desired number of results, i.e., layouts, has been achieved (step 824). If the desired number of results or layouts, has not been achieved, and the latest solution does not satisfy requirements of the inputs, the last or latest solution is invalidated and another instance of the SMT placement problem created (step 812) using the requirement of the inputs, the SMT solver called (step 814) and another solution to the SMT placement problem different from all solutions previously found is generated. The process is repeated until the number of layouts has been created, and/or at least one solution satisfies the input and the predetermined area requirement. The another layout created (step 816) and output (step 822).

Optionally, in one embodiment the method can further include determining from the layouts 820 created and output, an optimal solution based on, for example, the area required for the IC, on a complexity of the layout, such as a number masks necessary to fabricate the circuit, or on the netlist or the technology design rules, and identifying to the user the layout relating to the optimal solution.

In other embodiments the method can further include ranking the layouts 820 created and outputting a list of ranked solutions based on predefined metrics including the area required for the layout, the number of masks necessary to fabricate the circuit, and/or performance of the IC.

Figure 10:
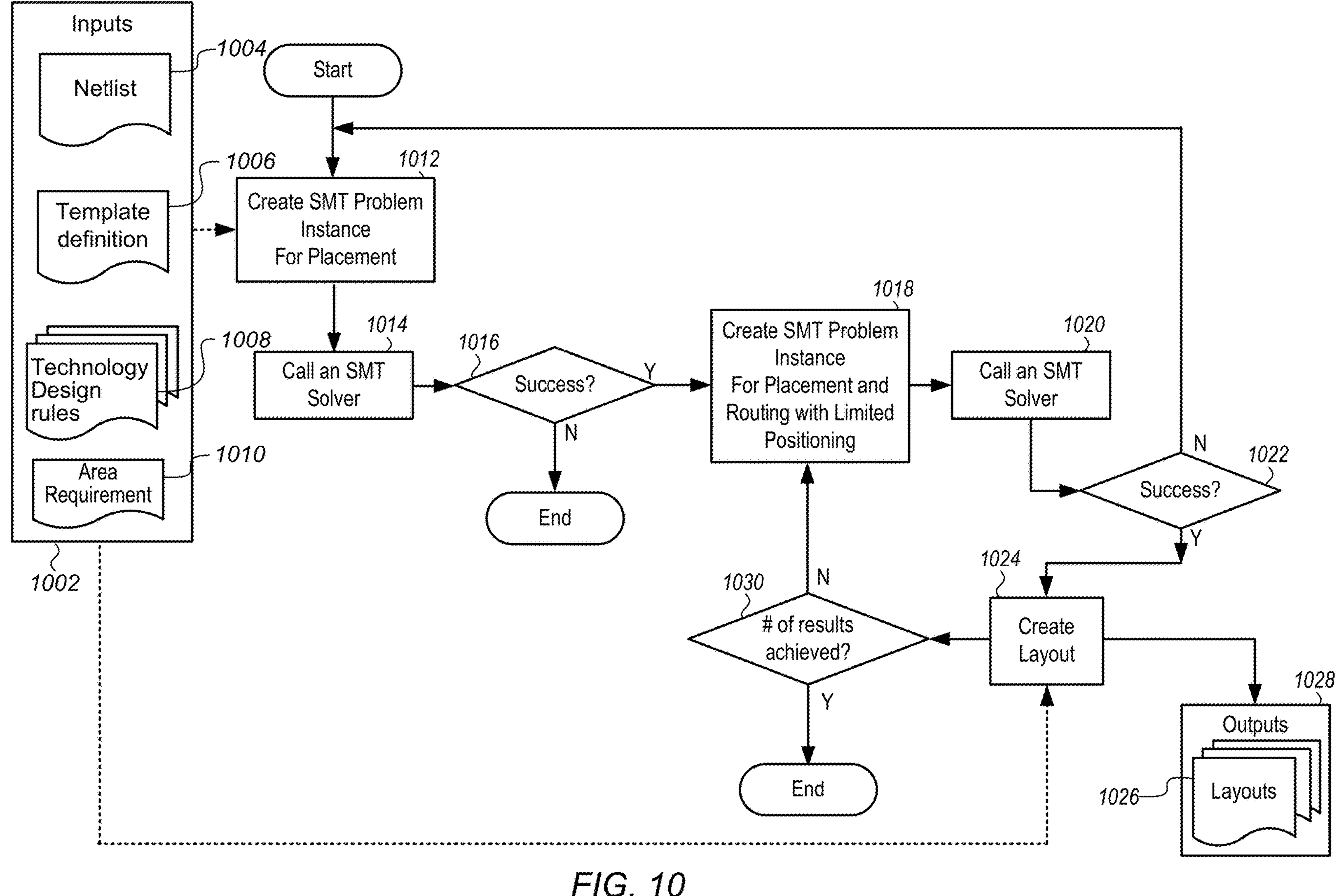
FIG. 10 is a simplified flow chart illustrating a process or method for integrated placement and routing with limited transistor positioning in a cell according to other embodiments of the present disclosure.

FIG. 10 is a simplified flow chart illustrating another process or method for integrated placement and routing with limited transistor positioning in a cell according to other embodiments of the present disclosure. Referring to FIG. 10, the method begins with receiving inputs 1002 including a netlist 1004, template definitions 1006 and one or more technology design rules 1008. Optionally or preferably, the inputs can further include a predetermined area requirement 1010 specified by a circuit designer or user. As with the embodiments described above all inputs can be entered through user interface input devices 222 and/or from a file storage subsystem 228. Generally, the netlist specifies functions and requirements for the circuit being designed and includes a list of electronic components, and a list of nodes the components to which they connect. By template definition it is meant common characteristics that apply to all cells on a library, such as horizontal and vertical pitches for pin connections, cell height, and power rail characteristics, among others. The cells can include both single and multi-height cells. By multi-height cells it is meant cells with a total height equal to a whole multiple, larger than one, of the template height. That is each cell can include multiple instances of the template repeatedly formed adjacent to one another. The technology design rules specify to constraints such as minimum width or spacing rules between components.

After all inputs have been entered an instance of a SMT problem for placement (SMT placement problem) is created (step 1012). Briefly, creating a SMT problem instance for placement includes translating or describing the components in a CDL (Circuit Description Language) format file, and for each component (transistor) define a set of SMT constants, including integer and Boolean constants, which represent the position of the components over an imaginary grid. To define the grid size the designer must indicate in the inputs (netlist 1004) whether the intended layout will include single or multi-height cells.

After all inputs 1002 have been entered, an SMT problem instance for placement created (step 1012), and a first SMT solver or subroutine is called and a solution generated (step 1014). Briefly, the first SMT instance like the SMT instances described above can include constraints to ensure that no two components or transistors are placed on the same grid coordinates.

Next, a determination is made whether or not the solution found by the first SMT solver was successful (step 1016). The solution is successful if none of the placed components or transistors overlap and it satisfies requirements of the inputs and the predetermined area requirement specified by a user. If it was not successful the method is ended, and the user notified.

If the identified solution is successful, an SMT problem instance for placement and routing with limited placement is created (step 1018), a second SMT solver or subroutine is called and a solution generated (step 1020). Briefly, the second SMT instance like the SMT instances described above can include constraints to ensure that no two components or transistors are placed on the same grid coordinates, and to analyze connectivity of the components to avoid creating short circuits. By limited placement it is meant that the SMT problem instance will allow placements restricted by the placement for components or transistors successfully placed by the solution generated in step 1014, with some added freedom. For example, the final transistor positions allowed may be either the original position, the original position translated to the left by one pitch or the original position translated to the right by one pitch. It is noted that this embodiment is exemplary only and other restrictions may be used.

Next, a determination is made whether or not the solution found by the second SMT solver was successful (step 1022). The solution is successful if none of the components overlap or require connections that result in a short circuit, and the solution satisfies all input requirements and the user specified area requirement.

If the solution to the SMT problem instance for placement and routing with limited placement is not successful, another instance of the SMT problem placement created (step 1012), the first SMT solver called and a new limited placement solution generated (step 1014). If the new solution for placement is successful, i.e., the components or transistors do not overlap, and the input and area requirements are satisfied, another SMT problem instance for placement and routing with limited placement is created (step 1018), the second SMT solver called and a new solution generated (step 1020).

If the solution is successful a layout 1026 for the IC including both placed and routed intra-cell transistors is created (step 1024) using the netlist, template definitions and technology design rules previously provided, and output in an output step (step 1028) through a user interface output device 220 to the designer.

A minimal example of a method for creating an SMT problem instance for placement and routing with limited transistor positioning is shown in Example D below.

Example D—Minimal Integrated Placement and Routing With Restricted Transistor Movement Example The objective of this algorithm is, given a netlist with an initial ordering, finding a routable ordering while the solver is allowed to perturb the initial ordering to some extent. In practice, this is achieved by using the algorithm showed in Example C, plus some constraints over the allowed transistor positions.

An initial ordering for the input netlist can be obtained using the method shown in Example A. From this ordering, constraints are added to the integrated placement and routing algorithm regarding the range where each transistor is allowed.

As an example, assume the value T_i_x0 represents the position of the transistor i in the initial ordering. If it is desired to limit the transistor positions so they only are allowed to move one column from the initial position, the following constraints are added to the solver:

```
(assert(and(>=T_1_x(-T_1_x0 1))(<=T_1_x(+T_1_x0 1))))
(assert(and(>=T_2_x(-T_2_x01))(<=T_1_x(+T_2_x0 1))))
(assert(and(>=T_3_x(-T_3_x0 1))(<=T_1_x(+T_3_x0 1))))
(assert(and(>=T_4_x(-T_4_x0 1))(<=T_1_x(+T_4_x0 1))))
(assert(and(>=T_5_x(-T_5_x0 1))(<=T_1_x(+T_5_x0 1))))
(assert(and(>=T_6_x(-T_6_x0 1))(<=T_1_x(+T_6_x0 1))))
```

When ordering dual height cells, transistors can be constrained furthermore such that their cell height does not change:

```
(assert(=T_1_y T_1_y0))
(assert(=T_2 y T 2 y0))
(assert(=T_3_y T_3_y0))
(assert(=T_4_y T_4_y0))
(assert(=T_5_y T_5_y0))
(assert(=T_6_y T_6_y0))
```

Alternatively, any sort of restriction can be applied to the final ordering by adding the appropriate extra constraints to the SMT problem instance.

In some embodiments, once a solution satisfying requirements of the inputs and the predetermined area requirement is found the layout relating to the solution is communicated to the user, and the method ends and the SMT solver is not called again in an attempt to find another, more optimal solution satisfying the requirements of the input and the predetermined area requirement.

In other embodiments, as shown in FIG. 10, the placed layout 1026 is one of a number of layouts created and output to the user in the output step (step 1028). Generally, in these embodiments after a layout is created (step 1024) a determination is made if the desired number of results, i.e., layouts, has been achieved (step 1030). If the desired number of results or layouts, has not been achieved another instance of the SMT problem is created (step 1018), the SMT solver called and a new solution generated (step 1020). If the new solution is a success (step 1022), i.e., if it satisfies the input and the predetermined area requirement, another layout 1026 is created (step 1024) and output (step 1028). The process is repeated until the desired number of layouts has been created.

As in embodiments described above, the method can further include determining from the layouts 1026 created and output, an optimal solution based on, for example, the area required for the IC, on a complexity of the layout, such as a number masks necessary to fabricate the circuit, or on the netlist or the technology design rules, and identifying to the user the layout relating to the optimal solution.

Alternatively, the method can further include ranking the layouts 1026 created and outputting a list of ranked solutions based on predefined metrics including the area required for the layout, the number of masks necessary to fabricate the circuit, and/or performance of the IC.

Embodiments of an EDA tool and method of operating the same for placement and routing of intra-cell devices in ICs have been described. Although the present disclosure has been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. § 1.72 (b), requiring an abstract that will allow the reader to quickly ascertain the nature of one or more embodiments of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

Reference in the description to one embodiment or an embodiment means that a particular feature, structure, or characteristic described in connection with the embodiment is included in at least one embodiment of the circuit or method. The appearances of the phrase one embodiment in various places in the specification do not necessarily all refer to the same embodiment.

What is claimed is:

1. A method for placement and routing of intra-cell transistors in an integrated circuit (IC), the method comprising:

receiving inputs including a netlist, template definitions and technology design rules;

creating a first instance of a Satisfiability Modulo Theory (SMT) problem for placement and routing by translating the inputs into a set of SMT constraints relating to the placement of a number of intra-cell transistors and routing for interconnects to the number of intra-cell transistors;

calling a SMT solver and using the set of SMT constraints generating a first solution to the SMT problem;

if the first solution satisfies requirements of the inputs and a predetermined area requirement specified by a user, creating and outputting a first layout for placement and routing of the number of intra-cell transistors in the IC;

determining whether a predetermined number of layouts has been created;

creating another instance of the SMT problem;

calling the SMT solver and generating another solution;

evaluating the solution against the requirements of the inputs and the predetermined area requirements;

creating and outputting another layout for placement and routing of the number of intra-cell transistors in the IC;

repeating the creating of instances of the SMT problem, generating of solutions, and creating and outputting of layouts until the predetermined number of layouts has been created;

ranking the layouts created based on predefined metrics including one or more of a number of masks needed for the layout, area required for the layout, and performance of the IC; and outputting the ranked layouts for the placement and routing of intra-cell transistors in the integrated circuit (IC).

2. The method of claim 1 wherein if the first solution does not satisfy requirements of the inputs and the predetermined area requirement, the method ends and the user notified.

3. The method of claim 1 wherein if the first solution satisfies requirements of the inputs and the predetermined area requirement, the method ends and the SMT solver is not called again in an attempt to find another, more optimal solution satisfying the requirements of the input and the predetermined area requirement.

4. The method of claim 1 further comprising determining from the layouts created and output, an optimal solution based on an area required or on the netlist or the technology design rules, and identifying to the user the layout relating to the optimal solution.

5. The method of claim 1 further comprising prior to creating the first instance of the SMT problem for placement and routing:

creating a SMT placement problem for the number of intra-cell transistors;

calling the first SMT solver;

generating a solution to the SMT placement problem; and if the solution to the SMT placement problem satisfies the requirements of the inputs, creating the first instance of the SMT problem for placement and routing with limited placement for the number of intra-cell transistors.

6. The method of claim 1, wherein the intra-cell transistors are arranged within cells that include both single-height cells and multi-height cells, the multi-height cells having a total height equal to a whole multiple of a template height defined by template definitions.

7. A method for placement and routing of intra-cell transistors in an integrated circuit (IC), the method comprising:

receiving inputs including a netlist of components available for use in the IC, template definitions of the components and a predetermined area requirement for the IC specified by a user, and technology design rules specifying design requirements for the components;

creating a first instance of a Satisfiability Modulo Theory (SMT) placement problem by translating the inputs into a first set of SMT constraints relating to the placement of a number of intra-cell transistors in the IC;

calling a first SMT solver and generating a first solution to the SMT placement problem;

if the first solution to the SMT placement problem satisfies requirements of the inputs, creating a first instance of a SMT placement and routing problem using the first solution to the SMT placement problem;

calling a second SMT solver and generating a first solution to the SMT placement and routing problem; and if the first solution to the SMT placement and routing problem satisfies requirements of the inputs, creating and outputting a first layout for placement and routing of intra-cell transistors in the IC.

8. The method of claim 7 wherein if the first solution to the SMT placement problem does not satisfy requirements of the inputs the method ends and the user notified.

9. The method of claim 7 further comprising determining if a predetermined number of layouts have been created, and if not:

creating a second instance of the SMT placement problem;

calling the first SMT solver and generating a second solution to the SMT placement problem;

if the second solution to the SMT placement problem satisfies the requirements of the inputs, creating a second instance of the SMT placement and routing problem using the second solution to the SMT placement problem;

calling the second SMT solver and generating a second solution to the SMT placement and routing problem;

if the second solution to the SMT placement and routing problem satisfies requirements of the inputs, creating and outputting a second layout for placement and routing of intra-cell transistors in the IC; and repeating the above steps until the predetermined number of layouts has been created.

10. The method of claim 9 further comprising determining from the layouts created and output, an optimal solution based on an area required or on the netlist or the technology design rules and identifying to the user the layout relating to the optimal solution.

11. The method of claim 9 further comprising ranking the layouts created and output based on predefined metrics including one or more of a number of masks needed for the layout, area required for the layout, and/or performance of the IC, and outputting a list of ranked solutions.

12. The method of claim 7 wherein the first SMT solver and second SMT solver are the same SMT solver.

13. The method of claim 7, wherein the intra-cell transistors are arranged within cells that include both single-height cells and multi-height cells, the multi-height cells having a total height equal to a whole multiple of a template height defined by template definitions.

14. A non-transitory computer-readable media having program instructions for placement and routing of intra-cell transistors in an integrated circuit (IC), the computer readable media comprising:

program instructions for receiving inputs including a netlist, template definitions and technology design rules;

program instructions for creating a first instance of a Satisfiability Modulo Theory (SMT) problem for placement and routing by translating the inputs into a set of SMT constraints relating to the placement of a number of intra-cell transistors and routing for interconnects to the number of intra-cell transistors;

program instructions for calling a SMT solver and using the set of SMT constraints generating a first solution to the SMT problem; if the first solution satisfies requirements of the inputs and a predetermined area requirement specified by a user, program instructions for creating and outputting a first layout for placement and routing of the number of intra-cell transistors in the IC;

program instructions for determining whether a predetermined number of layouts has been created;

program instructions for creating another instance of the SMT problem;

program instructions for calling the SMT solver and generating another solution;

program instructions for evaluating another solution against the requirements of the inputs and the predetermined area requirements;

program instructions for creating and outputting another layout for placement and routing of the number of intra-cell transistors in the IC;

program instructions for repeating the creating of instances of the SMT problem, generating of solutions, and creating and outputting of layouts until the predetermined number of layouts has been created;

program instructions for ranking the layouts created based on predefined metrics including one or more of a number of masks needed for the layout, area required for the layout, and performance of the IC; and program instructions for outputting the ranked layouts for the placement and routing of intra-cell transistors in an integrated circuit (IC).

15. The computer-readable media of claim 14 wherein if the first solution does not satisfy requirements of the inputs and the predetermined area requirement, further comprising program instructions for notifying the user and stopping execution of further program instructions.

16. The computer-readable media of claim 14 wherein if the first solution satisfies requirements of the inputs and the predetermined area requirement, further comprising program instructions for stopping execution of further program instructions, and not attempting to find another, more optimal solution satisfying the requirements of the input and the predetermined area requirement.

17. The computer-readable media of claim 14 further comprising program instructions to determine from the layouts created and output, an optimal solution based on an area required or on the netlist or the technology design rules, and to identify to the user the layout relating to the optimal solution.

* * * * *